(12) United States Patent
Tang et al.

(10) Patent No.: US 10,694,398 B2
(45) Date of Patent: Jun. 23, 2020

(54) SIGNAL TRANSMISSION METHOD, TERMINAL DEVICE, AND NETWORK DEVICE

(71) Applicant: Guangdong OPPO Mobile Telecommunications Corp., Ltd., Dongguan, Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/312,070

(22) PCT Filed: Sep. 29, 2016

(86) PCT No.: PCT/CN2016/100932
§ 371 (c)(1),
(2) Date: Dec. 20, 2018

(87) PCT Pub. No.: WO2018/058464
PCT Pub. Date: Apr. 5, 2018

(65) Prior Publication Data
US 2019/0208428 A1    Jul. 4, 2019

(51) Int. Cl.
| | |
|---|---|
| *H04L 12/28* | (2006.01) |
| *H04W 16/28* | (2009.01) |
| *H04W 48/12* | (2009.01) |
| *H04B 7/06* | (2006.01) |
| *H04W 56/00* | (2009.01) |

(52) U.S. Cl.
CPC .......... *H04W 16/28* (2013.01); *H04B 7/0617* (2013.01); *H04W 48/12* (2013.01); *H04W 56/00* (2013.01)

(58) Field of Classification Search
CPC ....................................................... H04L 12/50
USPC ......................................................... 370/410
See application file for complete search history.

(56) References Cited

U.S. PATENT DOCUMENTS

| | | |
|---|---|---|
| 2013/0286960 A1 | 10/2013 | Li et al. |
| 2014/0112220 A1 | 4/2014 | Kwak et al. |
| 2020/0008164 A1* | 1/2020 | Ko ..................... H04W 56/001 |

FOREIGN PATENT DOCUMENTS

| | | |
|---|---|---|
| CN | 104025469 A | 9/2014 |
| CN | 104620551 A | 5/2015 |
| WO | 2016115711 A1 | 7/2016 |

OTHER PUBLICATIONS

EP Search Report dated May 5, 2019.

* cited by examiner

*Primary Examiner* — Dang T Ton
(74) *Attorney, Agent, or Firm* — Young Basile Hanlon & MacFarlane, P.C.

(57) ABSTRACT

A method for signal transmission, a terminal device and a network device are provided. The method includes: a terminal device determines a number of beams used for transmitting signals or a number N of signals to be transmitted according to a detected synchronization signal and/or a detected synchronization channel, where N is a positive integer; the terminal device transmits the signals with a network device according to the number of the beams or the number N of the signals to be transmitted.

18 Claims, 3 Drawing Sheets

200
A network device determines a number of beams used for transmitting signals or determines a number N of signals to be transmitted, where N is a positive integer. — S210

The network device sends a synchronization signal and/or a synchronization channel to the terminal device, and the synchronization signal and/or the synchronization channel is generated based on the number of the beams or the number N of the signals to be transmitted. — S220

FIG. 4

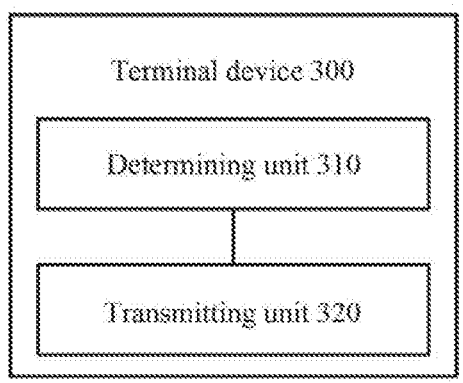

FIG. 5

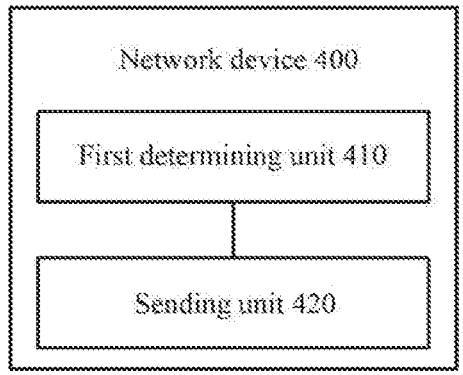

FIG. 6

SIGNAL TRANSMISSION METHOD, TERMINAL DEVICE, AND NETWORK DEVICE

CROSS-REFERENCE TO RELATED APPLICATION(S)

This application is a 371 application of International Application No. PCT/CN2016/100932, filed on Sep. 29, 2016, the entire disclosure of which is hereby incorporated by reference.

TECHNICAL FIELD

The present disclosure relates to the communication filed, in particular to a method for signal transmission, a terminal device and a network device.

BACKGROUND

Multiple-Input Multiple-Output (MIMO) technology is one of core technologies of the Long Term Evolution (LTE) system, which can greatly improve a transmission rate for the system. Beamforming is a signal preprocessing technology based on antenna arrays, which generates directional beams by adjusting weights of signals transmitted on each antenna element.

In the related art, generally at most one beam is used for signal transmission, and the number of the beams used for transmitting signals or the number of the signals to be transmitted cannot be flexibly configured, thus the quality of cell access is adversely affected.

SUMMARY

In view of this, implementations of the present disclosure provide methods for signal transmission and devices for signal transmission.

In a first aspect, a method for signal transmission is provided. The method includes: determining, by a terminal device, a number of beams used for transmitting signals or a number N of the signals to be transmitted according to a detected synchronization signal and/or a detected synchronization channel, wherein N is a positive integer; transmitting, by the terminal device, the signals with a network device according to the number of the beams or the number N of the signals to be transmitted.

In combination with the first aspect, in a first possible implementation of the first aspect, the synchronization signal carries sequence information, and determining, by the terminal device, the number of the beams used for transmitting the signals or the number N of the signals to be transmitted according to the detected synchronization signal, includes: the terminal device determines the number of the beams or the number N of the signals to be transmitted corresponding to the sequence information according to the sequence information.

In combination with the first aspect or any implementation of the first aspect, in a second possible implementation of the first aspect, the synchronization signal includes a primary synchronization signal and a secondary synchronization signal. And determining, by the terminal device, the number of the beams used for transmitting the signals or the number N of the signals to be transmitted according to the detected synchronization signal, includes: the terminal device determines, according to a number of first time-domain resource elements between the primary synchronization signal and the secondary synchronization signal, the number of the beams or the number N of the signals to be transmitted corresponding to the number of the first time-domain elements; or the terminal device determines, according to a number of first frequency-domain resource elements between the primary synchronization signal and the secondary synchronization signal, the number of the beams or the number N of the signals to be transmitted corresponding to the number of the first frequency-domain resource elements.

In combination with the first aspect or any implementation of the first aspect, in a third possible implementation of the first aspect, the synchronization channel carries indication information used for indicating the number of beams or the number N of signals to be transmitted. And determining, by the terminal device, the number of the beams used for transmitting the signals or the number N of the signals to be transmitted according to the detected synchronization channel, includes: the terminal device determines the number of the beams or the number N of the signals to be transmitted according to the indication information.

In combination with the first aspect or any implementation of the first aspect, in a fourth possible implementation of the first aspect, determining, by the terminal device, the number of the beams used for transmitting the signals or the number N of the signals to be transmitted according to the detected synchronization channel, includes: the terminal device determines, according to a scrambling sequence used for the detected synchronization channel, the number of the beams or the number N of the signals to be transmitted corresponding to the scrambling sequence.

In combination with the first aspect or any implementation of the first aspect, in a fifth possible implementation of the first aspect, determining, by the terminal device, the number of the beams used for transmitting the signals or the number N of the signals to be transmitted according to the detected synchronization signal and the synchronization channel, includes: the terminal device determines, according to a number of second time-domain resource elements between the synchronization signal and the synchronization channel, the number of the beams or the number N of the signals to be transmitted corresponding to the number of the second time-domain resource elements; or the terminal device determines, according to a number of second frequency-domain resource elements between the synchronization signal and the synchronization channel, the number of the beams or the number N of the signals to be transmitted corresponding to the number of the second frequency-domain resource elements.

In combination with the first aspect or any implementation of the first aspect, in a sixth possible implementation of the first aspect, determining, by the terminal device, the number of the beams used for transmitting the signals or the number N of the signals to be transmitted according to the detected synchronization signal or synchronization channel, includes: the terminal device determines, according to physical resources for the synchronization signal, the number of the beams or the number N of the signals to be transmitted corresponding to the physical resources for the synchronization signal; or the terminal device determines, according to physical resources for the synchronization channel, the number of the beams or the number N of the signals to be transmitted corresponding to the physical resources for the synchronization channel.

In combination with the first aspect or any implementation of the first aspect, in a seventh possible implementation of the first aspect, determining, by the terminal device, the number of the beams used for transmitting the signals or the number N of the signals to be transmitted according to the detected synchronization signal and/or the detected synchronization channel, includes: the terminal device determines whether the signals are to be transmitted by using one beam or M beams according to the synchronization signal or the synchronization channel, or determines whether the number of the signals to be transmitted is 1 or K according to the synchronization signal or the synchronization channel, M and K are pre-stored positive integers greater than 1, respectively.

In combination with the first aspect or any implementation of the first aspect, in an eighth possible implementation of the first aspect, the physical resources for transmitting the synchronization signal and physical resources for transmitting the synchronization channel have fixed relative positions, and/or the scrambling sequence used for the synchronization channel is generated based on the sequence information carried by the synchronization signal.

In combination with the first aspect or any implementation of the first aspect, in a ninth possible implementation of the first aspect, transmitting, by the terminal device, the signals with the network device according to the number of the beams or the number N of the signals to be transmitted, includes: the terminal device determines physical resources or a sequence resource corresponding to the number of the beams or the number N of the signals to be transmitted according to the number of the beams or the number N of the signals to be transmitted; the terminal device transmits the signals with the network device on the physical resources or by using the sequence resource.

In combination with the first aspect or any implementation of the first aspect, in a tenth possible implementation of the first aspect, transmitting, by the terminal device, the signals with the network device according to the number of the beams, includes: the terminal device sends the signal on which beamforming corresponding to the number of the beams has been performed, to the network device according to the number of the beams; or the terminal device receives the signal on which beamforming corresponding to the number of the beams has been performed, sent by the network device.

In combination with the first aspect or any implementation of the first aspect, in an eleventh possible implementation of the first aspect, transmitting, by the terminal device, the signals with the network device according to the number N of the signals to be transmitted, includes: the terminal device sends the N signals to the network device according to the number N of the signals to be transmitted; or the terminal device receives the N signals sent by the network device according to the number N of the signals to be transmitted.

In combination with the first aspect or any implementation of the first aspect, in a twelfth possible implementation of the first aspect, beamforming is performed on the N signals by using different beams, where N is a positive integer greater than 1.

In combination with the first aspect or any implementation of the first aspect, in a thirteenth possible implementation of the first aspect, the signals include at least one of the following signals: a broadcast signal, a random access signal, a reference signal, a control signal, and a beam reference signal.

In a second aspect, a method for signal transmission is provided. The method includes: a network device determines a number of beams used for transmitting signals or a number N of signals to be transmitted, wherein N is a positive integer; the network device sends a synchronization signal and/or a synchronization channel to a terminal device, and the synchronization signal and/or the synchronization channel is generated based on the number of the beams or the number N of the signals to be transmitted.

In combination with the second aspect or any implementation of the second aspect, in a first possible implementation of the second aspect, the method further includes: the network device determines sequence information corresponding to the number of the beams or the number N of the signals to be transmitted according to the number of the beams or the number N of the signals to be transmitted; sending, by the network device, the synchronization signal to the terminal device, includes: the network device sends the synchronization signal generated based on the sequence information to the terminal device.

In combination with the second aspect or any implementation of the second aspect, in a second possible implementation of the second aspect, the synchronization signal includes a primary synchronization signal and a secondary synchronization signal. The method further includes: the network device determines a number of first time-domain resource elements between the primary synchronization signal and the secondary synchronization signal corresponding to the number of the beams or the number N of the signals to be transmitted according to the number of the beams or the number N of the signals to be transmitted, or the network device determines a number of first frequency-domain resource elements between the primary synchronization signal and the secondary synchronization signal corresponding to the number of the beams or the number N of the signals to be transmitted according to the number of the beams or the number N of the signals to be transmitted. Sending, by the network device, the synchronization signal to the terminal device, includes: the network device sends the synchronization signal to the terminal device according to the number of the first time-domain resource elements or the number of the first-frequency-domain resource elements.

In combination with the second aspect or any implementation of the second aspect, in a third possible implementation of the second aspect, the method further includes: the network device determines indication information corresponding to the number of the beams or the number N of the signals to be transmitted according to the number of the beams or the number N of the signals to be transmitted. Sending, by the network device, the synchronization channel to the terminal device, includes: the network device sends the synchronization channel carrying the indication information to the terminal device.

In combination with the second aspect or any implementation of the second aspect, in a fourth possible implementation of the second aspect, the method further includes: the network device determines a number of second time-domain resource elements between the synchronization signal and the synchronization channel corresponding to the number of the beams or the number N of the signals to be transmitted according to the number of the beams or the number N of the signals to be transmitted, or the network device determines a number of second frequency-domain resource elements between the synchronization signal and the synchronization channel corresponding to the number of the beams or the number N of the signals to be transmitted according to the number of the beams or the number N of the signals to be transmitted. Sending, by the network device, the synchronization signal and the synchronization channel to the terminal device, includes: the network device sends the synchronization signal and the synchronization channel to the terminal device according to the number of the second time-domain resource elements or the number of the second frequency-domain resource elements.

In combination with the second aspect or any implementation of the second aspect, in a fifth possible implementation of the second aspect, the method further includes: the network device determines physical resources for the synchronization signal corresponding to the number of the beams or the number N of the signals to be transmitted according to the number of the beams or the number N of the signals to be transmitted; or the network device determines physical resources for the synchronization channel corresponding to the number of the beams or the number N of the signals to be transmitted according to the number of the beams or the number N of the signals to be transmitted; and sending, by the network device, the synchronization signal or the synchronization channel to the terminal device, includes: the network device sends the synchronization signal to the terminal device according to the physical resources for the synchronization signal; or the network device sends the synchronization channel to the terminal device according to the physical resources for the synchronization channel.

In combination with the second aspect or any implementation of the second aspect, in a sixth possible implementation of the second aspect, the signals include at least one of the following signals: a broadcast signal, a random access signal, a reference signal, a control signal, and a beam reference signal.

In a third aspect, a terminal device is provided. The terminal device is configured to perform the method in the above first aspect or any possible implementation of the first aspect. Specifically, the terminal device includes units configured to perform the method in the above first aspect or any possible implementation of the first aspect.

In a fourth aspect, a network device is provided. The network device is configured to perform the method in the above second aspect or any possible implementation of the second aspect. Specifically, the terminal device includes units configured to perform the method in the above second aspect or any possible implementation of the second aspect.

In a fifth aspect, a terminal device is provided. The terminal device includes a memory, a processor, a transceiver, and a bus system. The memory, the processor and the transceiver are connected through the bus system. The memory is used for storing instructions. The processor is used for executing the instructions stored in the memory, and when the instructions are executed, the processor is used for implementing the method of the first aspect, and controlling the transceiver to receive input data and information, and output data, such as an operation result.

In a sixth aspect, a network device is provided. The network device includes a memory, a processor, a transceiver, and a bus system. The memory, the processor and the transceiver are connected through the bus system. The memory is used for storing instructions. The processor is used for executing the instructions stored in the memory, and when the instructions are executed, the processor is used for implementing the method of the second aspect, and controlling the transceiver to receive input data and information, and output data, such as an operation result.

In a seventh aspect, a computer storage medium is provided. The computer storage medium is used for storing computer software instructions used for the above method, which includes programs designed for performing the above aspects.

In the present application, names of terminal devices and network devices do not limit the devices themselves, and in practical implementations, these devices may emerge under other names. As long as the function of each device is similar to that of the device in the present disclosure, it is within the scope of the claims of the present disclosure and the equivalent technologies.

These and other aspects of the present application will be more readily understood in the following description of the implementations.

BRIEF DESCRIPTION OF DRAWINGS

To describe the technical solutions of implementations of the present disclosure more clearly, accompanying drawings that are used in implementations of the present disclosure will be briefly described below. It is apparent that the accompanying drawings described below are only some implementations of the present disclosure, and for a person of ordinary skill in the art, other drawings may be obtained according to these drawings without paying an inventive effort.

FIG. 4 is another block diagram of a method for signal transmission according to an implementation of the present disclosure.

FIG. 5 is a block diagram of a terminal device for signal transmission according to an implementation of the present disclosure.

FIG. 6 is a block diagram of a network device for signal transmission according to an implementation of the present disclosure.

DETAILED DESCRIPTION

Figure 1:
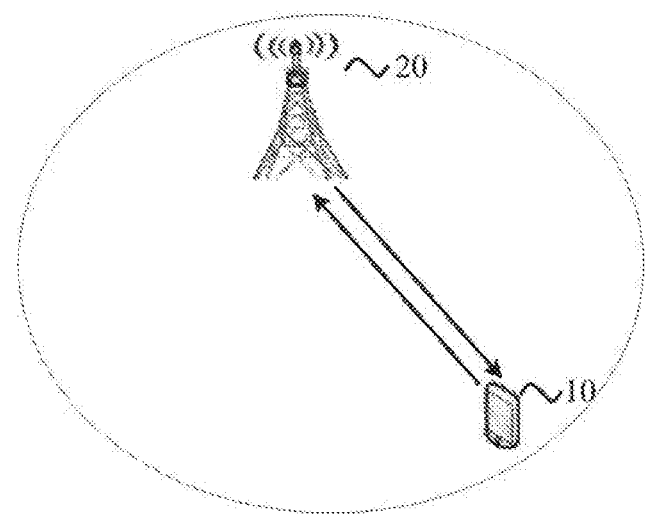
FIG. 1 is a schematic diagram of a possible application scenario according to an implementation of the present disclosure.

The technical solutions in implementations of the present disclosure will be described clearly and completely in the following with reference to the drawings in implementations of the present disclosure. Obviously, the described implementations are part, but not all, of the implementations of the present disclosure. Based on the implementations of the present disclosure, all other implementations obtained by a person of ordinary skill in the art without paying an inventive effort shall fall within the protection scope of the present disclosure.

It should be understood that the technical solutions of the implementations of the present disclosure may be applied to various communication systems, such as, a Global System of Mobile communication (GSM) system, a Code Division Multiple Access (CDMA) system, a Wideband Code Division Multiple Access (WCDMA) system, a General Packet Radio Service (GPRS) system, a long term evolution (LTE) system, a LTE Frequency Division Duplex (FDD) system, a LTE Time Division Duplex (TDD) system, a Universal Mobile Telecommunication System (UMTS) system or a Worldwide Interoperability for Microwave Access (Wi-MAX) communication system, and a future 5G system.

In particular, the technical solutions of the implementations of the present disclosure may be applied to various communication systems based on non-orthogonal multiple access technology, such as a Sparse Code Multiple Access (SCMA) system, and a Low Density Signature (LDS) system. Of course, the SCMA system and LDS system may also be referred to as other names in the communication field. Further, the technical solutions of the implementations of the present disclosure may be applied to multi-carrier transmission systems based on the non-orthogonal multiple access technology, such as, an orthogonal frequency division multiplexing (OFDM) system based on the non-orthogonal multiple access technology, a Filter Bank Multi-carrier (FBMC) system, a Generic Frequency Division Multiplexing (GFDM) system, and a Filtered Orthogonal Frequency Division Multiplexing (F-OFDM) system.

A terminal device in an implementation of the present disclosure may refer to user equipment (UE), an access terminal, a subscriber unit, a subscriber station, a mobile station, a rover station, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a personal digital assistant (PDA), a handheld device with a wireless communication function, a computing device or other processing device connected to a wireless modem, an on-board device, a wearable device, a terminal device in a future 5G network, or a terminal device in a future evolved public land mobile network (PLMN), etc., which are not restricted in the implementations of the present disclosure.

A network device in an implementation of the present disclosure may be a device for communicating with a terminal device, and the network device may be a Base Transceiver Station (BTS) in the GSM or CDMA system, a NodeB (NB) in the WCDMA system, an evolved base station (eNB or eNodeB) in the LTE system, or a wireless controller in a Cloud Radio Access Network (CRAN) scenario, or the network device may be a relay station, an access point, an on-board device, a wearable device, a network device in a future 5G network, or a network device in a future evolved PLMN, etc., which are not restricted in the implementations of the present disclosure.

FIG. 1 is a schematic diagram of an application scenario of the present disclosure. A communication system in FIG. 1 may include a terminal device 10 and a network device 20. The network device 20 is configured to provide communication services for the terminal device 10 and access to a core network. The terminal device 10 accesses the network by searching for a synchronization signal, or a broadcast signal, etc., transmitted by the network device 20 to communicate with the network. Arrows shown in FIG. 1 may indicate uplink/downlink transmission through cellular links between the terminal device 10 and the network device 20.

Figure 2:
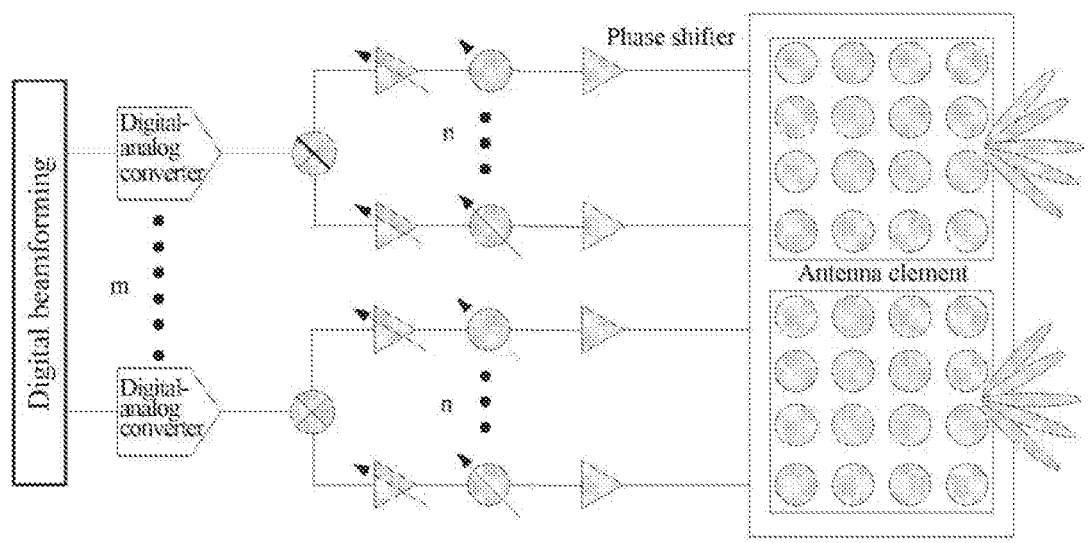
FIG. 2 is a schematic diagram of a possible beamforming.

Unlike the single beam transmission mechanism in the LTE system, in a future communication system, data transmission in a high frequency band (a center frequency is more than 6 GHz, typically, e.g., 28 GHz) needs to be supported. In order to achieve higher transmission rate, the multiple input multiple output (MIMO) technology needs to be adopted. Using MIMO technology on the high frequency has high requirements on RF components of an antenna, and hardware cost of the antenna (such as analog (A)/digital (D) converter and D/A converter) will be greatly increased. In order to reduce the cost, a mixed beamforming mode is usually used in the high frequency band to reduce the number of transceiver radio-frequency units. As shown in FIG. 2, after digital beamforming is performed on data signals, digital sending signals are formed for each radio-frequency unit and converted into analog signals by a digital-to-analog converter. The analog signals corresponding to each radio-frequency unit pass through different phase shifters to form analog forming signals to be transmitted on different antenna elements, so that beamforming is realized in the analog domain. With the mixed beamforming method, the number of radio-frequency channels can be reduced, thereby reducing the hardware cost, and obtaining the beamforming gain.

Figure 3:
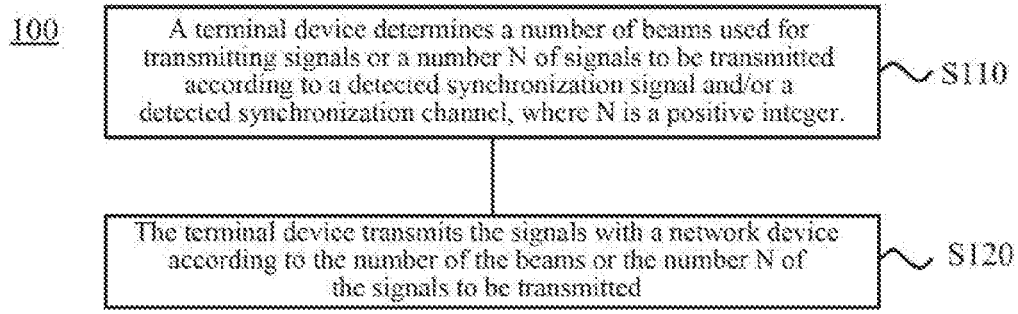
FIG. 3 is a block diagram of a method for signal transmission according to an implementation of the present disclosure.

FIG. 3 is a block diagram of a method 100 for signal transmission according to an implementation of the present disclosure. As shown in FIG. 3, the method 100 includes following acts S110 and S120.

In S110, a terminal device determines a number of beams used for transmitting signals or a number N of signals to be transmitted according to a detected synchronization signal and/or a detected synchronization channel, where N is a positive integer.

In S120, the terminal device transmits the signals with a network device according to the number of the beams or the number N of the signals to be transmitted.

The following needs to be explained.

Firstly, the signals here may be uplink signals, or downlink signals. The signals may include at least one of the following signals: a broadcast signal, a random access signal, a reference signal, a control signal, and a beam reference signal.

Secondly, there is one-to-one correspondence between the number of the beams and the number N of the signals to be transmitted. Specifically, N beamforming signals may be obtained through N beams.

Thirdly, transmitting signals with network device here refers to sending and receiving signals with the network device. It may refer to that the terminal device receives the signals sent by the network device, or the terminal device sends the signals to the network device.

With the continuous development of communication technology, diversified service types are needed in future communication systems, and the multi-beam transmission mechanism emerges. Flexible configuration of the number of beams used for transmitting the signals or the number of signals to be transmitted can improve the quality of cell access, and since both the single-beam transmission mechanism and the multi-beam transmission mechanism are supported, there is a good tradeoff between the detection complexity and the beamforming gain.

It should be understood that the number of the signals to be transmitted may be represented by the number of resources, for example, the number of resources for channel state information-reference signals (CSI-RS).

Optionally, in an implementation of the present disclosure, the synchronization signal carries sequence information, and determining, by the terminal device, the number of the beams used for transmitting the signals or the number N of the signals to be transmitted according to the detected synchronization signal, includes: the terminal device determines the number of the beams or the number N of the signals to be transmitted corresponding to the sequence information according to the sequence information.

Optionally, the sequence information may be a sequence identification used for generating a sequence. The sequence information may be obtained from a primary synchronization signal, or may be obtained from a secondary synchronization signal, or may be obtained from a combination of the primary synchronization signal and the secondary synchronization signal. Specifically, the terminal device may pre-store a corresponding relationship between sequence information and the number of beams or the number of signals to be transmitted, and then determine the number of beams or the number of signals to be transmitted according to the sequence information. For example, the number of beams or the number of signals to be transmitted corresponding to a sequence identification within a range of 0-503 is 1, that is, single beam transmission, and the number of beams or the number of signals to be transmitted corresponding to a sequence identification within a range of 504-1007 is N, that is, multi-beam transmission, where N is a predetermined positive integer greater than 1. Alternatively, the number of beams or the number of signals to be transmitted corresponding to a sequence identification within a range of 0 to 100 may be 1, the number of beams or the number of signals to be transmitted corresponding to a sequence identification within a range of 101 to 200 may be 2, and the number of beams or the number of signals to be transmitted corresponding to a sequence identification within a range of 201 to 300 may be 3.

Optionally, in an implementation of the present disclosure, the synchronization signal includes a primary synchronization signal and a secondary synchronization signal. And determining, by the terminal device, the number of the beams used for transmitting the signals or the number N of the signals to be transmitted according to the detected synchronization signal, includes: the terminal device determines, according to a number of first time-domain resource elements between the primary synchronization signal and the secondary synchronization signal, the number of the beams or the number N of the signals to be transmitted corresponding to the number of the first time-domain resource elements; or the terminal device determines, according to a number of first frequency-domain resource elements between the primary synchronization signal and the secondary synchronization signal, the number of the beams or the number N of the signals to be transmitted corresponding to the number of the first frequency-domain resource elements.

Specifically, the number of the first time-domain resource elements may be a number of transmission time elements between the primary synchronization signal and the secondary synchronization signal. Here, the transmission time elements may be subframes, OFDM symbols, time slots, shortened time slots, or shortened subframes, etc. The number of the first frequency-domain resource elements may be a number of physical resource blocks (PRB), a number of subcarriers, etc. The terminal device may pre-store a corresponding relationship between a number of first frequency-domain resource elements and a number of beams or a number of signals to be transmitted. The terminal device may pre-store a corresponding relationship between a number of first time-domain resource elements and a number of beams or a number of signals to be transmitted. For example, if the number of OFDM symbols between the primary synchronization signal and the secondary synchronization signal is A, the number of the beams or the number of the signals to be transmitted is 1, that is, single beam transmission. If the number of OFDM symbols between the primary synchronization signal and the secondary synchronization signal is B, the number of the beams or the number of the signals to be transmitted is N, that is, multi-beam transmission, where N is a predetermined value.

Optionally, in an implementation of the present disclosure, the synchronization channel carries indication information for indicating a number of beams or a number N of signals to be transmitted. And determining, by the terminal device, the number of the beams used for transmitting the signals or the number N of the signals to be transmitted according to the detected synchronization channel, includes: the terminal device determines the number of the beams or the number N of the signals to be transmitted according to the indication information. A corresponding relationship between indication information and the number of beams or the number of signals to be transmitted may be pre-agreed between the network device and the terminal device, or may be configured by the network device and indicated to the terminal device through a signaling. The indication information may also be used for indicating a beam identification of a current beam. For example, the indication information may be of 1 bit, and it may be agreed that, if the indication information is 0, a single beam may be determined, and if the indication information is 1, multiple (N) beams may be determined, where N is a predetermined positive integer greater than 1. For another example, if the indication information is of 2 bits, it may be agreed that, the number of the beams corresponding to 00 is 1, the number of the beams corresponding to 01 is 2, the number of the beams corresponding to 10 is 3, and the number of the beams corresponding to 11 is 4.

Optionally, in an implementation of the present disclosure, determining, by the terminal device, the number of the beams used for transmitting the signals or the number N of the signals to be transmitted according to the detected synchronization channel, includes: the terminal device determines, according to a scrambling sequence used in the detected synchronization channel, the number of the beams or the number N of the signals to be transmitted corresponding to the scrambling sequence. Specifically, the terminal device may pre-store a corresponding relationship between a sequence identification and the number of beams or the number of signals to be transmitted, and then determine the number of the beams or the number of the signals to be transmitted according to the sequence identification used for generating the scrambling sequence. For example, when the sequence identification is less than A, the corresponding number of the beams or the corresponding number of the signals to be transmitted is K1, when the sequence identification is greater than or equal to A and less than B, the corresponding number of the beams or the corresponding number of the signals to be transmitted is K2, and when the sequence identification is greater than or equal to B, the corresponding number of the beams or the corresponding number of the signals to be transmitted is K3.

Optionally, in an implementation of the present disclosure, determining, by the terminal device, the number of the beams used for transmitting the signals or the number N of the signals to be transmitted according to the detected synchronization signal and the synchronization channel, includes: the terminal device determines, according to a number of second time-domain resource elements between the synchronization signal and the synchronization channel, the number of the beams or the number N of the signals to be transmitted corresponding to the number of the second time-domain resource elements; or the terminal device determines, according to a number of second frequency-domain resource elements between the synchronization signal and the synchronization channel, the number of the beams or the number N of the signals to be transmitted corresponding to the number of the second frequency-domain resource elements.

Specifically, the number of the second time-domain resource elements may be a number of transmission time elements between the synchronization signal and the synchronization channel. Here, the transmission time elements may be subframes, OFDM symbols, time slots, shortened time slots, or shortened subframes, etc. The number of the second frequency-domain resource elements may be a number of physical resource blocks (PRB), a number of subcarriers, etc. The terminal device may pre-store a corresponding relationship between a number of first frequency-domain resource elements and a number of beams or a number of signals to be transmitted. The terminal device may pre-store a corresponding relationship between a number of first time-domain resource elements and a number of beams or a number of signals to be transmitted. For example, if a number of OFDM symbols between the primary synchronization signal and the secondary synchronization signal is A, the number of the beams or the number of the signals to be transmitted is 1, that is, single beam transmission. If a number of OFDM symbols between the primary synchronization signal and the secondary synchronization signal is B, the number of the beams or the number of the signals to be transmitted is N, that is, multi-beam transmission, where N is a predetermined value.

Optionally, in an implementation of the present disclosure, determining, by the terminal device, the number of the beams used for transmitting the signals or the number N of the signals to be transmitted according to the detected synchronization signal or the detected synchronization channel, includes: the terminal device determines, according to physical resources for the synchronization signal, the number of the beams or the number N of the signals to be transmitted corresponding to the physical resources for the synchronization signal; or the terminal device determines, according to physical resources for the synchronization channel, the number of the beams or the number N of the signals to be transmitted corresponding to the physical resources for the synchronization channel.

Optionally, a corresponding relationship between physical resources for a synchronization signal and the number of beams or the number of signals to be transmitted may be pre-agreed between the network device and the terminal device, or may be configured by the network device and indicated to the terminal device through a signaling.

Optionally, a corresponding relationship between physical resources for a synchronization channel and the number of beams or the number of signals to be transmitted may be pre-agreed between the network device and the terminal device, or may be configured by the network device and indicated to the terminal device through a signaling.

Optionally, in an implementation of the present disclosure, determining, by the terminal device, the number of the beams used for transmitting the signals or the number N of the signals to be transmitted according to the detected synchronization signal and/or the detected synchronization channel, includes: the terminal device determines whether the signals are to be transmitted by using one beam or M beams according to the synchronization signal or the synchronization channel, or determines whether the number of the signals to be transmitted is 1 or K according to the synchronization signal or the synchronization channel, where M and K are respectively pre-stored positive integers greater than 1.

As a special implementation, the number of the beams or the number of the signals to be transmitted may be 0, and in such a situation the terminal does not need to receive signals. Those skilled in the art should understand that some signals can only be transmitted under the multi-beam mechanism. If the number of the beams for transmitting these signals is 1, then the terminal device may not transmit and receive these signals. For example, if the signal is a beam reference signal and the number of the beams is 1, then the beam reference signal does not need to be received. For another example, if the signal is a beam reference signal and the number of the signals to be transmitted is 0, the beam reference signal may not need to be received. It should be understood that the beam reference signal is taken only as an example for description, and the present disclosure is not limited thereto.

It should also be understood that the above various corresponding relationships may be indicated to the terminal device by the network device, or may be pre-agreed between the network device and the terminal device. And in the above, some relevant characteristics of the synchronization signal and/or synchronization channel are taken only as examples for description, and the present disclosure is not limited thereto.

As a specific implementation, a terminal device detects a synchronization signal, and obtains a synchronization sequence identification from the synchronization signal by blind detection. The synchronization sequence identification is obtained from an identification 1 carried by a primary synchronization signal and an identification 2 carried by a secondary synchronization signal. The terminal determines a number N of beams used for PBCH transmission according to the synchronization sequence identification. Herein, a correspondence between the synchronization sequence identification and the number of the beams is pre-agreed between the terminal device and the network device. A part of the synchronization sequence identifications correspond to a single beam, and the other part of the synchronization sequence identifications correspond to multiple beams. In the case of multiple beams, the number of the beams is fixed to K, that is, the number of the beams N is 1 or K. The terminal may receive the PBCH according to the number N of the beams. Herein, the terminal needs to receive N PBCH signals respectively, and these PBCH signals are sent by the network device to the terminal device after performing beamforming on these signals by using N beams, and the N PBCH signals are transmitted by using different physical resources. The physical resources for the PBCH signals are N physical resources that have a fixed mapping relationship with the physical resources for the detected synchronization signal.

As another specific implementation, a terminal device detects a synchronization signal. The terminal device detects a PBCH corresponding to the synchronization signal and obtains a number of signals for transmission according to indication information for the number of signals for transmission carried by the PBCH. The terminal device receives subsequent N beam reference signals according to the number N of the signals to be transmitted. Herein, the terminal needs to receive N beam reference signals, and each beam reference signal is sent by the network device to the terminal device after performing beamforming on the beam reference signal using a different beam, and the N beam reference signals are transmitted by using different physical resources. The physical resources used for the N beam reference signals are N physical resources pre-agreed between the terminal device and the network device.

Optionally, in an implementation of the present disclosure, a synchronization channel is a channel associated with a synchronization signal: the physical resources for the synchronization channel and the synchronization signal have fixed relative positions, and/or a scrambling sequence of the synchronization channel is generated by using a sequence identification carried by the synchronization signal. Specifically, there may be a fixed time offset between the transmission time element where the synchronization signal is located and the transmission time element where the synchronization channel is located, or there may be a fixed frequency offset between the frequency-domain element where the synchronization signal is located and the frequency-domain element where the synchronization channel is located.

It should be understood that, the synchronization channel may be a Physical Broadcast Channel (PBCH), a Physical Sidelink Broadcast Channel (PSBCH), or the like. The signal to be transmitted may be a broadcast signal such as a Physical Broadcast Channel (PBCH), a random access signal such as a Physical Random Access Channel (PRACH), a Channel State Information-Reference Signal (CSI-RS), a Demodulation Reference Signal (DMRS), or a control signal, and typically, the signal may be a Beam Reference Signal (BRS).

Optionally, in an implementation of the present disclosure, transmitting, by the terminal device, the signals with the network device according to the number of the beams or the number N of the signals to be transmitted, includes: the terminal device determines physical resources or a sequence resource corresponding to the number of the beams or the number N of the signals to be transmitted according to the number of the beams or the number N of the signals to be transmitted; and the terminal device transmits the signals with the network device on the physical resources or by using the sequence resource.

Specifically, a physical resource used by a signal corresponding to each beam may be pre-agreed between the terminal device and the network device, the terminal device and/or the network device determines the signal corresponding to the beam to be sent according to the number of the beams or the number N of the signals to be transmitted, and transmits and receives the corresponding signal on the physical resource for the signal corresponding to each beam. For example, the terminal device and the network device may pre-agree that the physical resources corresponding to the number of the beams or the number N of the signals to be transmitted being 4 are the physical resources 1 to 4 (assuming that all physical resources are divided into 20 resources and positions corresponding to physical resources with different labels are unique), then when the terminal device needs to transmit random access signals, the physical resources 1 to 4 may be determined according to the number of the beams or the number N of the signals to be transmitted to transmit the random access signals. Herein, each physical resource may include multiple time-domain resource elements and multiple frequency-domain resource elements. The terminal device and the network device may pre-agree the sequence resource used for the signal corresponding to each beam, herein the sequence resource may be a sequence determined and used for transmitting the signal. It should be understood that the above description is only an exemplary implementation of the present disclosure, and implementations of the present disclosure are not limited thereto.

Optionally, in an implementation of the present disclosure, transmitting, by the terminal device, the signals with the network device according to the number of the beams includes: the terminal device sends the signals on which beamforming corresponding to the number of the beams has been performed, to the network device, according to the number of the beams; or the terminal device receives the signals on which beamforming corresponding to the number of the beams has been performed, sent by the network device.

Optionally, in another implementation of the present disclosure, transmitting, by the terminal device, the signals with the network device according to the number N of the signals to be transmitted, includes: the terminal device sends the N signals to the network device according to the number N of the signals to be transmitted; or the terminal device receives the N signals sent by the network device according to the number N of the signals to be transmitted.

It should be understood that the transmission generally includes transmitting and receiving, in other words, the transmission in the implementations of the present disclosure includes a terminal device transmits a signal, and a terminal device receives a signal. And the terminal device sends the signals on which the beamforming has been performed to the network device according to the determined number of the beams or the determined number N of the signals to be transmitted, or the terminal device receives the signals on which the beamforming has been performed, sent by the network device according to the determined number of the beams or the determined number N of the signals to be transmitted.

Optionally, the beamforming is performed on the N signals by using different beams, where N is a positive integer greater than 1. Specifically, it means that the signals may apply different beamforming, or different beams are used to perform sending-forming.

Further, in an implementation of the present disclosure, after the terminal device transmits the signals with the network device according to the number of the beams or the number N of the signals to be transmitted, the method further includes: the terminal device receives feedback information sent by the network device according to the number of the beams or the number N of the signals, or the terminal device sends feedback information to the network device according to the number of the beams or the number N of the signals, and the feedback information is used for indicating a first beam in a beam set corresponding to the number of the beams or a first signal in a signal set corresponding to the number N of the signals.

Those skilled in the art should understand that the beamforming technology can be categorized into two modes according to the feedback mode of channel information, i.e., a mode based on code book and a mode based on channel reciprocity. The former is based on codebook information fed back by the terminal, and the network device determines a precoding codebook to be used for a next transmission. The latter uses channel reciprocity to obtain downlink channel information according to a sounding reference signal (SRS) sent in uplink, and performs calculation and selection of a precoding matrix needed in downlink. For example, if a network device uses N beams for beamforming, the terminal device usually reports a beam index or an index of a CSI-RS resource corresponding to the beam index according to the number of the beams, for the network device to perform beamforming on subsequent data. In general, the beam index reported by the terminal device may be an index of a beam in multiple beams used by the network device for transmitting a signal with a best signal quality among the downlink signals, or may be an index of a signal with a second-highest quality or other beam indexes, which is not restricted in the present disclosure.

Optionally, the feedback information includes a beam identification of the first beam and/or channel state information (CSI) corresponding to the beam identification, or the feedback information includes a signal identification of the first signal and/or channel state information (CSI) corresponding to the signal identification.

The terminal device may feed back the beam identification (e.g. beam index) according to the number of the beams. Each beam identification indicates an identification of one beam in all beams corresponding to the number of the beams. For example, assuming that the number of the beams is N, the number of bits of the beam identification may be $\log_2 N$. The terminal may receive the signal corresponding to each beam according to the number of the beams so as to report the beam identification. The terminal device may feed back CSI corresponding to the beam identification at the same time. Specifically, in addition to feeding back information indicating a beam, the terminal device also needs to feed back CSI obtained based on measurement on the beam. For example, the CSI includes at least one of: a rank indicator (RI), a precoding matrix indicator (PMI), and a channel quality indicator (CQI).

The terminal device performs feedback of the signal identification according to the number of signals. Each signal identification indicates an identification of a signal in all signals corresponding to the number of signals, for example, assuming that the number of signals is N, the number of bits of the signal identification may be $\log_2 N$. The signal here may be represented by resources used by the signal, and the signal identification may be a signal resource identification, such as, a CSI-RS resource identification. For example, the terminal device determines that the number of the CSI-RS resources is 4, then CSI-RS signals on the 4 CSI-RS resources are detected respectively, and a CSI-RS signal with a best signal quality among the detected signals is obtained, and an index of the CSI-RS resource corresponding to the CSI-RS signal is fed back to the network device as a signal identification. The terminal device may perform CSI feedback corresponding to the signal identification at the same time. Specifically, the terminal device needs to feed back CSI obtained based on measurement on the signal corresponding to the resource identification, in addition to feeding back the resource identification. For example, the CSI may be at least one of: a rank indication (RI), a precoding matrix indicator (PMI), a channel quality indicator (CQI), etc.

Therefore, with the method for signal transmission provided by implementations of the present disclosure, the number of the beams used for transmitting signals or the number of the signals to be transmitted can be flexibly configured, thereby improving the quality of cell access, and since both a single beam transmission mechanism and a multi-beam transmission mechanism are supported, there is a good tradeoff between detection complexity and beamforming gain. At the same time, it solves the problem that there is no mechanism in the related art to enable the network device or the terminal device to determine the beam used for subsequent transmission in the cell access process, and the terminal cannot obtain the beamforming gain immediately after the cell access.

The method for signal transmission according to implementations of the present disclosure has been described in detail from the angle of the terminal device, and a method for signal transmission 200 according to an implementation of the present disclosure will be described below from the angle of a network device with reference to FIG. 4. As shown in FIG. 4, the method for signal transmission 200 includes following acts S210 and S220.

In S210, a network device determines a number of beams used for transmitting signals or determines a number N of signals to be transmitted, where N is a positive integer.

In S220, the network device sends a synchronization signal and/or a synchronization channel to the terminal device. The synchronization signal and/or the synchronization channel is generated based on the number of the beams or the number N of the signals to be transmitted.

With the continuous development of communication technology, diversified service types are needed in future communication systems, and the multi-beam transmission mechanism emerges. Flexible configuration for the number of the beams used for transmitting the signals or the number of the signals to be transmitted can improve the quality of cell access, and since both the single-beam transmission mechanism and the multi-beam transmission mechanism are supported, there is a good tradeoff between the detection complexity and the beamforming gain.

Optionally, in an implementation of the present disclosure, the method further includes: the network device determines sequence information corresponding to the number of the beams or the number N of the signals to be transmitted according to the number of the beams or the number N of the signals to be transmitted. Sending, by the network device, the synchronization signal to the terminal device, includes: the network device sends a synchronization signal generated based on the sequence information to the terminal device.

Optionally, in an implementation of the present disclosure, the synchronization signal includes a primary synchronization signal and a secondary synchronization signal, and the method further includes: the network device determines a number of first time-domain resource elements between the primary synchronization signal and the secondary synchronization signal corresponding to the number of the beams or the number N of the signals to be transmitted according to the number of the beams or the number N of the signals to be transmitted, or the network device determines a number of first frequency-domain resource elements between the primary synchronization signal and the secondary synchronization signal corresponding to the number of the beams or the number N of the signals to be transmitted according to the number of beams or the number N of the signals to be transmitted. And sending, by the network device, the synchronization signal to the terminal device, includes: the network device sends the synchronization signal to the terminal device according to the number of the first time-domain resource elements or the number of the first frequency-domain resource elements.

Optionally, in an implementation of the present disclosure, the method further includes: the network device determines indication information corresponding to the number of the beams or the number N of the signals to be transmitted according to the number of the beams or the number N of the signals to be transmitted. Sending, by the network, the synchronization channel to the terminal device, includes: the network device sends a synchronization channel carrying the indication information to the terminal device.

Optionally, in an implementation of the present disclosure, the method further includes: the network device determines a number of second time-domain resource elements between the synchronization signal and the synchronization channel corresponding to the number of the beams or the number N of the signals to be transmitted according to the number of the beams or the number N of the signals to be transmitted, or the network device determines a number of second frequency-domain resource elements between the synchronization signal and the synchronization channel corresponding to the number of the beams or the number N of the signals to be transmitted according to the number of the beams or the number N of the signals to be transmitted. Sending, by the network device, the synchronization signal and the synchronization channel to the terminal device, includes: the network device sends the synchronization signal and the synchronization channel to the terminal device according to the number of the second time-domain resource elements or the number of the second frequency-domain resource elements.

Optionally, in an implementation of the present disclosure, the method further includes: the network device determines physical resources for the synchronization signal corresponding to the number of the beams or the number N of the signals to be transmitted according to the number of the beams or the number N of the signals to be transmitted; or the network device determines physical resources for the synchronization channel corresponding to the number of the beams or the number N of the signals to be transmitted according to the number of the beams or the number N of the signals to be transmitted. And sending, by the network device, the synchronization signal or the synchronization channel to the terminal device, includes: the network device sends the synchronization signal to the terminal device according to the physical resources for the synchronization signal; or the network device sends the synchronization channel to the terminal device according to the physical resources for the synchronization channel.

It should be understood that the interaction with the terminal device, related characteristics, and functions of the network device, etc. correspond to related characteristics and functions of the terminal device, which will not be repeated here for sake of conciseness.

The methods for signal transmission of implementations of the present disclosure have been described in detail above. Devices for signal transmission of implementations of the present disclosure will be described below with reference to FIGS. 5 to 8. The technical features described in the method implementations are applicable to the following device implementations.

FIG. 5 illustrates a terminal device 300 for signal transmission according to an implementation of the present disclosure. As shown in FIG. 5, the terminal device 300 includes a determining unit 310 and a transmitting unit 320.

The determining unit 310 is configured to determine a number of beams used for transmitting signals or a number N of signals to be transmitted according to a detected synchronization signal and/or synchronization channel, where N is a positive integer.

The transmitting unit 320 is configured to transmit the signals with the network device according to the number of the beams or the number N of the signals to be transmitted.

Therefore, with the terminal device provided by the implementation of the present disclosure, the number of the beams used for transmitting signals or the number of the signals to be transmitted can be flexibly configured, thereby improving the quality of cell access, and since both a single beam transmission mechanism and a multi-beam transmission mechanism are supported, there is a good tradeoff between detection complexity and beamforming gain.

Optionally, in an implementation of the present disclosure, the synchronization signal carries sequence information. And the determining unit 310 is specifically configured to determine the number of the beams or the number N of the signals to be transmitted corresponding to the sequence information according to the sequence information.

Optionally, in an implementation of the present disclosure, the synchronization signal includes a primary synchronization signal and a secondary synchronization signal. And the determining unit 310 is specifically configured to determine, according to a number of first time-domain resource elements between the primary synchronization signal and the secondary synchronization signal, the number of the beams or the number N of the signals to be transmitted corresponding to the number of the first time-domain resource elements; or determine, according to a number of first frequency-domain resource elements between the primary synchronization signal and the secondary synchronization signal, the number of the beams or the number N of the signals to be transmitted corresponding to the number of the first frequency-domain resource elements.

Optionally, in an implementation of the present disclosure, the synchronization channel carries indication information used for indicating the number of the beams or the number N of signals to be transmitted. And the determining unit 310 is specifically configured to determine the number of the beams or the number N of the signals to be transmitted according to the indication information.

Optionally, in an implementation of the present disclosure, the determining unit 310 is specifically configured to determine, according to a scrambling sequence used for the synchronization channel, the number of the beams or the number N of the signals to be transmitted corresponding to the scrambling sequence.

Optionally, in an implementation of the present disclosure, the determining unit 310 is specifically configured to determine, according to a number of second time-domain resource elements between the synchronization signal and the synchronization channel, the number of the beams or the number N of the signals to be transmitted corresponding to the number of the second time-domain resource elements; or determine, according to a number of second frequency-domain resource elements between the synchronization signal and the synchronization channel, the number of the beams or the number N of the signals to be transmitted corresponding to the number of the second frequency-domain resource elements.

Optionally, in an implementation of the present disclosure, the determining unit 310 is specifically configured to determine, according to physical resources for the synchronization signal, the number of the beams or the number N of the signals to be transmitted corresponding to the physical resources for the synchronization signal; or determine, according to physical resources for the synchronization channel, the number of the beams or the number N of the signals to be transmitted corresponding to the physical resources for the synchronization channel.

Optionally, in an implementation of the present disclosure, the determining unit 310 is specifically configured to determine whether the signals are to be transmitted by using one beam or M beams according to the synchronization signal or the synchronization channel, or determine whether the number of the signals to be transmitted is 1 or K according to the synchronization signal or the synchronization channel, and M and K are pre-stored positive integers greater than 1, respectively.

Optionally, in an implementation of the present disclosure, the physical resources for transmitting the synchronization signal and the synchronization channel have fixed relative positions, and/or the scrambling sequence used for the synchronization channel is generated based on the sequence information carried by the synchronization signal.

Optionally, in an implementation of the present disclosure, the transmitting unit 320 is specifically configured to determine physical resources or a sequence resource corresponding to the number of the beams or the number N of the signals to be transmitted according to the number of the beams or the number N of the signals to be transmitted; and transmit the signals with the network device on the physical resources or by using the sequence resource.

Optionally, in an implementation of the present disclosure, the transmitting unit 320 is specifically configured to send the signals on which beamforming corresponding to the number of the beams has been performed, to the network device, according to the number of the beams; or receive the signals on which beamforming corresponding to the number of the beams has been performed, sent by the network device.

Optionally, in an implementation of the present disclosure, the transmitting unit 320 is specifically configured to send the N signals to the network device according to the number N of the signals to be transmitted; or receive the N signals sent by the network device according to the number N of the signals to be transmitted.

Optionally, in an implementation of the present disclosure, beamforming is performed on the N signals by using different beams, where N is a positive integer greater than 1.

Optionally, in an implementation of the present disclosure, the signals include at least one of the following signals: a broadcast signal, a random access signal, a reference signal, a control signal, and a beam reference signal.

It should be understood that, the terminal device 300 for signal transmission according to the implementation of the present disclosure may correspond to the terminal device in the method implementations of the present disclosure, and the above operations and other operations and/or functions of various units in the terminal device 300 are respectively for the purpose of implementing corresponding flows of the method in FIG. 3, and will not be repeated here for sake of conciseness.

FIG. 6 is a network device 400 for signal transmission according to an implementation of the present disclosure. As shown in FIG. 6, the network device 400 includes a first determining unit 410 and a sending unit 420.

The first determining unit 410 is configured to determine a number of beams used for transmitting signals or a number N of signals to be transmitted, where N is a positive integer.

The sending unit 420 is configured to transmit a synchronization signal and/or a synchronization channel to a terminal device, and the synchronization signal and/or the synchronization channel is generated based on the number of the beams or the number N of the signals to be transmitted.

Therefore, the network device provided by the implementation of the present disclosure sends the synchronization signal and/or synchronization channel generated based on the number of the beams or the numbers of the signals to be transmitted to the terminal device, so that the terminal device can flexibly configure the number of the beams used for transmitting the signals or the number of the signals to be transmitted according to the detected synchronization signal and/or synchronization channel, thereby improving the quality of cell access, and since both the single-beam transmission mechanism and the multi-beam transmission mechanism are supported, there is a good tradeoff between detection complexity and beamforming gain.

Optionally, in an implementation of the present disclosure, the network device 400 further includes a second determining unit configured to determine sequence information corresponding to the number of the beams or the number N of the signals to be transmitted according to the number of the beams or the number N of the signals to be transmitted. And the sending unit 420 is specifically configured to send a synchronization signal generated based on the sequence information to the terminal device.

Optionally, in an implementation of the present disclosure, the synchronization signal includes a primary synchronization signal and a secondary synchronization signal. The network device 400 further includes a third determining unit configured to determine a number of first time-domain resource elements between the primary synchronization signal and the secondary synchronization signal corresponding to the number of the beams or the number N of the signals to be transmitted according to the number of the beams or the number N of the signals to be transmitted; or determine a number of first frequency-domain resource elements between the primary synchronization signal and the secondary synchronization signal corresponding to the number of the beams or the number N of the signals to be transmitted according to the number of the beams or the number N of the signals to be transmitted. The sending unit 420 is specifically configured to send the synchronization signal to the terminal device according to the number of the first time-domain resource elements or the number of the first frequency-domain resource elements.

Optionally, in an implementation of the present disclosure, the network device 400 further includes a fourth determining unit configured to determine indication information corresponding to the number of the beams or the number N of the signals to be transmitted according to the number of the beams or the number N of the signals to be transmitted. The sending unit 420 is specifically configured to send a synchronization channel carrying the indication information to the terminal device.

Optionally, in an implementation of the present disclosure, the network device 400 further includes a fifth determining unit configured to determine a number of second time-domain resource elements between the synchronization signal and the synchronization channel corresponding to the number of the beams or the number N of the signals to be transmitted according to the number of the beams or the number N of the signals to be transmitted, or determine a number of second frequency-domain resource elements between the synchronization signal and the synchronization channel corresponding to the number of the beams or the number N of the signals to be transmitted according to the number of the beams or the number N of the signals to be transmitted. The sending unit 420 is specifically configured to send the synchronization signal and the synchronization channel to the terminal device according to the number of the second time-domain resource elements or the number of the second frequency-domain resource elements.

Optionally, in an implementation of the present disclosure, the network device 400 further includes a sixth determining unit configured to determine physical resources for the synchronization signal corresponding to the number of the beams or the number N of the signals to be transmitted according to the number of the beams or the number N of the signals to be transmitted; or determine physical resources for the synchronization channel corresponding to the number of the beams or the number N of the signals to be transmitted according to the number of the beams or the number N of the signals to be transmitted. The sending unit 420 is specifically configured to send the synchronization signal to the terminal device according to the physical resources for the synchronization signal; or send the synchronization channel to the terminal device according to the physical resources for the synchronization channel.

Optionally, in an implementation of the present disclosure, the signals include at least one of the following signals: a broadcast signal, a random access signal, a reference signal, a control signal, and a beam reference signal.

It should be understood that, the network device 400 for signal transmission according to the implementation of the present disclosure may correspond to the network device in the method implementations of the present disclosure, and the above operations and other operations and/or functions of the various units in the network device 400 are respectively for the purpose of implementing the corresponding flows of the method in FIG. 4, which will not be repeated here for sake of conciseness.

Figure 7:
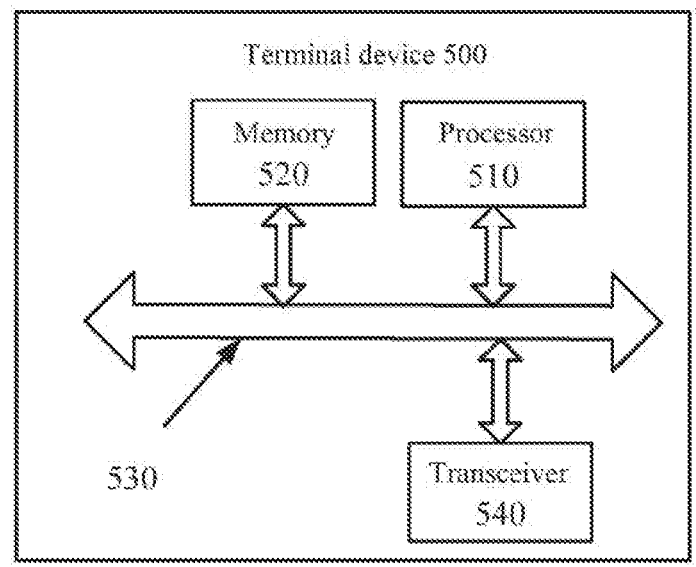
FIG. 7 is another block diagram of a terminal device for signal transmission according to an implementation of the present disclosure.

As shown in FIG. 7, an implementation of the present disclosure also provides a terminal device 500 for signal transmission. The terminal device 500 includes a processor 510, a memory 520, a bus system 530 and a transceiver 540. The processor 510, the memory 520 and the transceiver 540 are connected through the bus system 530. The memory 520 is used for storing instructions, and the processor 510 is used for executing the instructions stored in the memory 520 to control the transceiver 540 to send signals. And the processor 510 is configured to determine a number of beams used for transmitting the signals or a number N of signals to be transmitted according to a detected synchronization signal and/or synchronization channel, wherein N is a positive integer; and transmit the signals with the network device according to the number of the beams or the number N of the signals to be transmitted.

Therefore, with the terminal device for signal transmission provided by the implementation of the present disclosure, the number of the beams used for transmitting the signals or the number of the signals to be transmitted can be flexibly configured, thereby improving the quality of cell access, and since both single-beam transmission mechanism and multi-beam transmission mechanism are supported, there is a good tradeoff between detection complexity and beamforming gain.

It should be understood that in an implementation of the present disclosure, the processor 510 may be a central processing unit (CPU), and the processor 510 may be other general-purpose processor, a digital signal processor (DSP), an application specific integrated circuit (ASIC), an off-the-shelf programmable gate array (FPGA) or other programmable logic device, a discrete gate or a transistor logic device, or a discrete hardware component, etc. The general-purpose processor may be a microprocessor or the processor may be any conventional processor, or the like.

The memory 520 may include a read only memory and a random access memory, and provide instructions and data to the processor 510. A portion of the memory 520 may further include a non-volatile random access memory. For example, the memory 520 may further store device-type information.

The bus system 530 may include, in addition to a data bus, a power bus, a control bus, a status signal bus, etc. However, for the sake of clarity, various buses are illustrated as the bus system 530 in the figures.

In an implementation process, the various acts of the above method may be accomplished by instructions in the form of software or integrated logic circuits of hardware in the processor 510. The acts of the method disclosed in combination with the implementations of the present disclosure may be directly implemented by a hardware processor or by a combination of hardware and software modules in the processor. The software modules may be located in typical storage mediums in the art such as a random access memory, a flash memory, a read-only memory, a programmable read-only memory, an electrically erasable programmable memory, a register. The storage medium is located in the memory 520, and the processor 510 reads the information in the memory 520 and completes the acts of the above method in combination with its hardware. In order to avoid repetition, it will not be described in detail here.

Optionally, in an implementation of the present disclosure, the synchronization signal carries sequence information, and the processor 510 is specifically configured to determine the number of the beams or the number N of the signals to be transmitted corresponding to the sequence information according to the sequence information.

Optionally, in an implementation of the present disclosure, the synchronization signal includes a primary synchronization signal and a secondary synchronization signal. And the processor 510 is specifically configured to determine, according to a number of first time-domain resource elements between the primary synchronization signal and the secondary synchronization signal, the number of the beams or the number N of the signals to be transmitted corresponding to the number of the first time-domain resource elements; or determine, according to a number of first frequency-domain resource elements between the primary synchronization signal and the secondary synchronization signal, the number of the beams or the number N of the signals to be transmitted corresponding to the number of the first frequency-domain resource elements.

Optionally, in an implementation of the present disclosure, the synchronization channel carries indication information used for indicating the number of beams or the number N of signals to be transmitted, and the processor 510 is specifically configured to determine the number of the beams or the number N of the signals to be transmitted according to the indication information.

Optionally, in an implementation of the present disclosure, the processor 510 is specifically configured to determine, according to a number of second time-domain resource elements between the synchronization signal and the synchronization channel, the number of the beams or the number N of the signals to be transmitted corresponding to the number of the second time-domain resource elements; or determine, according to a number of second frequency-domain resource elements between the synchronization signal and the synchronization channel, the number of the beams or the number N of the signals to be transmitted corresponding to the number of the second frequency-domain resource elements.

Optionally, in an implementation of the present disclosure, the processor 510 is specifically configured to determine, according to physical resources for the synchronization signal, the number of the beams or the number N of the signals to be transmitted corresponding to the physical resources for the synchronization signal; or determine, according to physical resources for the synchronization channel, the number of the beams or the number N of the signals to be transmitted corresponding to physical resources for the synchronization channel.

Optionally, in an implementation of the present disclosure, the processor 510 is specifically configured to determine whether the signals are to be transmitted by using one beam or M beams according to the synchronization signal or the synchronization channel, or determine whether the number of the signals for transmission is 1 or K according to the synchronization signal or the synchronization channel, and M and K are pre-stored positive integers greater than 1, respectively.

Optionally, in an implementation of the present disclosure, the physical resources for transmitting the synchronization signal and the synchronization channel have fixed relative positions, and/or the scrambling sequence used for the synchronization channel is generated based on the sequence information carried by the synchronization signal.

Optionally, in an implementation of the present disclosure, the processor 510 is specifically configured to determine physical resources or a sequence resource corresponding to the number of the beams or the number N of the signals to be transmitted according to the number of the beams or the number N of the signals to be transmitted; and transmit the signals with the network device on the physical resources or by using the sequence resource.

Optionally, in an implementation of the present disclosure, the processor 510 is specifically configured to send the signals on which beamforming corresponding to the number of the beams has been performed, to the network device according to the number of the beams; or receive the signals on which beamforming corresponding to the number of the beams has been performed, sent by the network device.

Optionally, in an implementation of the present disclosure, the processor 510 is specifically configured to send the N signals to the network device according to the number N of the signals to be transmitted; or receive the N signals sent by the network device according to the number N of the signals to be transmitted.

Optionally, in an implementation of the present disclosure, beamforming is performed on the N signals by using different beams, where N is a positive integer greater than 1.

Optionally, in an implementation of the present disclosure, the signals include at least one of the following signals: a broadcast signal, a random access signal, a reference signal, a control signal, and a beam reference signal.

It should be understood that the terminal device 500 for signal transmission according to the implementation of the present disclosure may correspond to the terminal device 300 in an implementation of the present disclosure and may correspond to the terminal device performing the method according to implementations of the present disclosure, and the above operations and other operations and/or functions of various units in the terminal device 500 are respectively for implementing the corresponding flows of the method in FIG. 3, and will not be repeated here for sake of conciseness.

Figure 8:
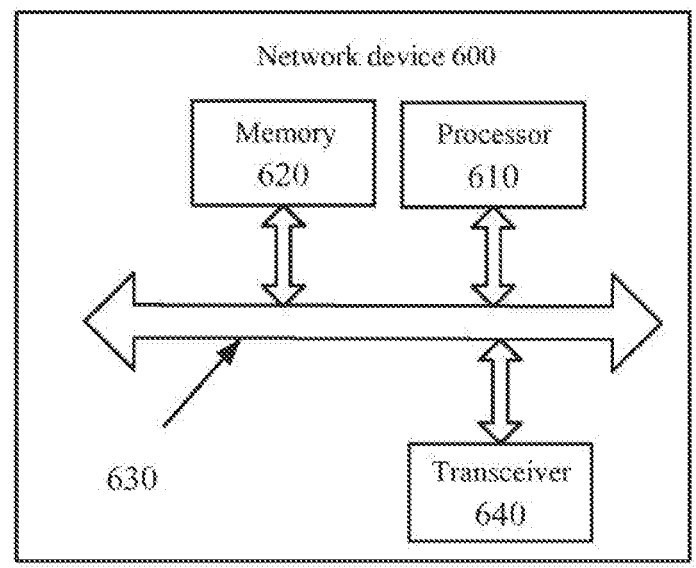
FIG. 8 is another block diagram of a network device for signal transmission according to an implementation of the present disclosure.

As shown in FIG. 8, an implementation of the present disclosure also provides a network device 600 for signal transmission. The network device 600 includes a processor 610, a memory 620, a bus system 630 and a transceiver 640. The processor 610, the memory 620 and the transceiver 640 are connected through the bus system 630. The memory 620 is used for storing instructions, and the processor 610 is used for executing the instructions stored in the memory 620 to control the transceiver 640 to send signals. The processor 610 is configured to determine a number of beams used for transmitting signals or a number N of signals to be transmitted, where N is a positive integer; and send a synchronization signal and/or a synchronization channel to a terminal device, and the synchronization signal and/or the synchronization channel is generated based on the number of the beams or the number N of the signals to be transmitted.

Therefore, the network device for signal transmission provided by the implementation of the present disclosure sends the synchronization signal and/or synchronization channel generated based on the number of the beams or the numbers of the signals to be transmitted, to the terminal device, so that the terminal device can flexibly configure the number of the beams used for transmitting the signals or the number of the signals to be transmitted according to the detected synchronization signal and/or synchronization channel, thereby improving the quality of cell access, and since both the single-beam transmission mechanism and the multi-beam transmission mechanism are supported, there is a good tradeoff between detection complexity and beamforming gain.

It should be understood that in an implementation of the present disclosure, the processor 610 may be a central processing unit (CPU), and the processor 610 may be other general purpose processor, a digital signal processor (DSP), an application specific integrated circuit (ASIC), an off-the-shelf programmable gate array (FPGA) or other programmable logic device, a discrete gate or a transistor logic device, or a discrete hardware component, etc. The general purpose processor may be a microprocessor or the processor may be any conventional processor, or the like.

The memory 620 may include a read only memory and a random access memory, and provide instructions and data to the processor 610. A portion of the memory 620 may further include a non-volatile random access memory. For example, the memory 620 may further store device-type information.

The bus system 630 may include, in addition to a data bus, a power bus, a control bus, a status signal bus, etc. However, for the sake of clarity, various buses are illustrated as the bus system 630 in the figures.

In an implementation process, the various acts of the above method may be accomplished by instructions in the form of software or integrated logic circuits of hardware in the processor 610. The acts of the method disclosed in combination with the implementations of the present disclosure may be directly implemented by a hardware processor or by a combination of hardware and software modules in the processor. The software modules may be located in typical storage mediums in the art such as a random access memory, a flash memory, a read-only memory, a programmable read-only memory, an electrically erasable programmable memory, a register. The storage medium is located in the memory 620, and the processor 610 reads the information in the memory 620 and completes the acts of the above method in combination with its hardware. In order to avoid repetition, it will not be described in detail here.

Optionally, in an implementation of the present disclosure, the processor 610 is specifically configured to determine sequence information corresponding to the number of the beams or the number N of the signals to be transmitted according to the number of the beams or the number N of the signals to be transmitted; send a synchronization signal generated based on the sequence information to the terminal device.

Optionally, in an implementation of the present disclosure, the synchronization signal includes a primary synchronization signal and a secondary synchronization signal. And the processor 610 is specifically configured to determine a number of first time-domain resource elements between the primary synchronization signal and the secondary synchronization signal corresponding to the number of the beams or the number N of the signals to be transmitted according to the number of the beams or the number N of the signals to be transmitted; or determine a number of first frequency-domain resource elements between the primary synchronization signal and the secondary synchronization signal corresponding to the number of the beams or the number N of the signals to be transmitted according to the number of the beams or the number N of the signals to be transmitted; send the synchronization signal to the terminal device according to the number of the first time-domain resource elements or the number of the first frequency-domain resource elements.

Optionally, in an implementation of the present disclosure, the processor 610 is specifically configured to determine indication information corresponding to the number of the beams or the number N of the signals to be transmitted according to the number of the beams or the number N of the signals to be transmitted; send a synchronization channel carrying the indication information to the terminal device.

Optionally, in an implementation of the present disclosure, the processor 610 is specifically configured to determine a number of second time-domain resource elements between the synchronization signal and the synchronization channel corresponding to the number of the beams or the number N of the signals to be transmitted according to the number of the beams or the number N of the signals to be transmitted, or determine a number of second frequency-domain resource elements between the synchronization signal and the synchronization channel corresponding to the number of the beams or the number N of the signals to be transmitted according to the number of the beams or the number N of the signals to be transmitted; and send the synchronization signal and the synchronization channel to the terminal device according to the number of the second time-domain resource elements or the number of the second frequency-domain resource elements.

Optionally, in an implementation of the present disclosure, the processor 610 is specifically configured to determine physical resources for the synchronization signal corresponding to the number of the beams or the number N of the signals to be transmitted according to the number of the beams or the number N of the signals to be transmitted; or determine physical resources for the synchronization channel corresponding to the number of the beams or the number N of the signals to be transmitted according to the number of the beams or the number N of the signals to be transmitted; and send the synchronization signal to the terminal device according to the physical resources for the synchronization signal; or send the synchronization channel to the terminal device according to the physical resources for the synchronization channel.

Optionally, the signals include at least one of the following signals: a broadcast signal, a random access signal, a reference signal, a control signal, and a beam reference signal.

It should be understood that the network device 600 for signal transmission according to the implementation of the present disclosure may correspond to the network device 400 in an implementation of the present disclosure and may correspond to the network device performing the method in the implementations of the present disclosure, and the above operations and other operations and/or functions of the various units in the network device 600 are respectively for implementing the corresponding flows of the method in FIG. 4, and will not be described here for conciseness.

It should be understood that in implementations of the present disclosure, "B corresponding to A" means that B is associated with A, and B can be determined according to A. It should also be understood that determining B according to A does not mean determining B according to A only, but also according to A and/or other information.

Those of ordinary skill in the art will recognize that the elements and algorithm acts of the examples described in connection with the implementations disclosed herein can be implemented in electronic hardware, computer software, or a combination of the electronic hardware and the computer software. In order to clearly illustrate the interchangeability of hardware and software, the composition and acts of the examples have been described in general terms by functions in the above description. Whether these functions are performed in hardware or software depends on the specific application and design constraints of the technical solution. Skilled artisans may use different methods to implement the described functions for each particular application, but such implementation should not be considered to be beyond the scope of the present disclosure.

Those skilled in the art can clearly understand that for convenience and conciseness of description, the specific working process of the system, device and unit described above may refer to the corresponding process in the aforementioned method implementations and will not be repeated here.

In several implementations provided in the present application, it should be understood that the disclosed system, apparatus, and method may be implemented in other ways. For example, the device implementation described above is only illustrative, for example, the division of the unit is only a logical function division, and there may be other ways of division in actual implementation, for example, multiple units or components may be combined or integrated into another system, or some features may be ignored or not executed. In addition, the coupling or direct coupling or communication connection between each other shown or discussed may be an indirect coupling or communication connection through some interfaces, devices or units, or may be an electrical, mechanical or other form of connection.

The unit described as a separate unit may or may not be physically separated, and the unit shown as a unit may or may not be a physical unit, i.e., may be located in one place or may be distributed over multiple network units. Some or all of the elements can be selected according to actual needs to achieve the purpose of the implementation of the present disclosure.

In addition, various functional units in various implementations of the present disclosure may be integrated in one processing module, or each unit may exist physically alone, or two or more units may be integrated in one module. The above-mentioned integrated modules can be implemented in the form of hardware or software functional modules.

An integrated module may be stored in a computer readable storage medium if it is implemented in the form of a software function module and sold or used as an independent product. Based on such understanding, the technical solution of the present disclosure may be embodied in the form of a software product, which is stored in a storage medium and includes instructions for causing a computer device (which may be a personal computer, a server, or a network device, etc.) to perform all or part of the acts of the method of various implementations of the present disclosure. The aforementioned storage media include a U disk, a mobile hard disk, a read-only memory, a random access memory, a magnetic disk, an optical disk, or other mediums capable of storing program codes.

What are described above are merely exemplary implementations of the present disclosure, but the protection scope of the present disclosure is not limited thereto, and any person skilled in the art may easily conceive various equivalent modifications or substitutions within the technical scope disclosed by the present disclosure.

What we claim is:

1. A method for signal transmission, comprising:

determining, by a terminal device, a quantity of beams used for transmitting signals or a number N of the signals to be transmitted according to at least one of a detected synchronization signal and a detected synchronization channel, wherein N is a positive integer; and transmitting, by the terminal device, the signals with a network device according to the quantity of the beams or the number N of the signals to be transmitted;

wherein the synchronization signal comprises a primary synchronization signal and a secondary synchronization signal; determining, by the terminal device, the quantity of the beams used for transmitting the signals or the number N of the signals to be transmitted according to the detected synchronization signal, comprises:

determining, by the terminal device, according to a quantity of first time-domain resource elements between the primary synchronization signal and the secondary synchronization signal, the quantity of the beams or the number N of the signals to be transmitted corresponding to the quantity of the first time-domain resource elements; or determining, by the terminal device, according to a quantity of first frequency-domain resource elements between the primary synchronization signal and the secondary synchronization signal, the quantity of the beams or the number N of the signals to be transmitted corresponding to the quantity of the first frequency-domain resource elements.

2. The method of claim 1, wherein the synchronization signal carries sequence information; determining, by the terminal device, the quantity of the beams used for transmitting the signals or the number N of the signals to be transmitted according to the detected synchronization signal, comprises:

determining, by the terminal device, the quantity of the beams or the number N of the signals to be transmitted corresponding to the sequence information, according to the sequence information.

3. The method of claim 1, wherein the synchronization channel carries indication information used for indicating the quantity of the beams or the number N of the signals to be transmitted; determining, by the terminal device, the quantity of the beams used for transmitting the signals or the number N of the signals to be transmitted according to the detected synchronization channel, comprises:

determining, by the terminal device, the quantity of the beams or the number N of the signals to be transmitted according to the indication information.

4. The method of claim 1, wherein determining, by the terminal device, the quantity of the beams used for transmitting the signals or the number N of the signals to be transmitted according to the detected synchronization channel, comprises:

determining, by the terminal device, according to a scrambling sequence used for the detected synchronization channel, the quantity of the beams or the number N of the signals to be transmitted corresponding to the scrambling sequence.

5. The method of claim 1, wherein determining, by the terminal device, the quantity of the beams used for transmitting the signals or the number N of the signals to be transmitted according to the detected synchronization signal and the detected synchronization channel, comprises:

determining, by the terminal device, according to a quantity of second time-domain resource elements between the synchronization signal and the synchronization channel, the quantity of the beams or the number N of the signals to be transmitted corresponding to the quantity of the second time-domain resource elements; or determining, by the terminal device, according to a quantity of second frequency-domain resource elements between the synchronization signal and the synchronization channel, the quantity of the beams or the number N of the signals to be transmitted corresponding to the quantity of the second frequency-domain resource elements.

6. The method of claim 1, wherein determining, by the terminal device, the quantity of the beams used for transmitting the signals or the number N of the signals to be transmitted according to the detected synchronization signal and the detected synchronization channel, comprises:

determining, by the terminal device, according to physical resources for the synchronization signal, the quantity of the beams or the number N of the signals to be transmitted corresponding to the physical resources for the synchronization signal; or determining, by the terminal device, according to physical resources for the synchronization channel, the quantity of the beams or the number N of the signals to be transmitted corresponding to the physical resources for the synchronization channel.

7. The method of claim 1, wherein determining, by the terminal device, the quantity of the beams used for transmitting the signals or the number N of the signals to be transmitted according to at least one of the detected synchronization signal and the detected synchronization channel, comprises:

determining, by the terminal device, whether the signals are to be transmitted by using one beam or M beams according to at least one of the synchronization signal and the synchronization channel, or determining, by the terminal device, whether the quantity of the signals to be transmitted is 1 or K according to at least one of the synchronization signal and the synchronization channel, wherein M and K are pre-stored positive integers greater than 1, respectively.

8. The method of claim 1, wherein physical resources for transmitting the synchronization signal and the synchronization channel have fixed relative positions; or a scrambling sequence used for the synchronization channel is generated based on sequence information carried by the synchronization signal; or physical resources for transmitting the synchronization signal and the synchronization channel have fixed relative positions, and a scrambling sequence used for the synchronization channel is generated based on sequence information carried by the synchronization signal.

9. The method of claim 1, wherein transmitting, by the terminal device, the signals with the network device according to the quantity of the beams or the number N of the signals to be transmitted, comprises:

determining, by the terminal device, physical resources or a sequence resource corresponding to the quantity of the beams or the number N of the signals to be transmitted according to the quantity of the beams or the number N of the signals to be transmitted; and transmitting, by the terminal device, the signals with the network device, on the physical resources or by using the sequence resource, wherein transmitting, by the terminal device, the signals with the network device according to the quantity of the beams, comprises:

sending, by the terminal device, the signals on which beamforming corresponding to the quantity of the beams has been performed, to the network device, according to the quantity of the beams; or receiving, by the terminal device, the signals on which beamforming corresponding to the quantity of the beams has been performed, sent by the network device, wherein transmitting, by the terminal device, the signals with the network device according to the number N of the signals to be transmitted, comprises:

sending, by the terminal device, the N signals to the network device according to the number N of the signals to be transmitted; or receiving, by the terminal device, the N signals sent by the network device according to the number N of the signals to be transmitted.

10. The method of claim 9, wherein beamforming is performed on the N signals by using different beams, wherein N is a positive integer greater than 1.

11. The method of claim 1, wherein the signals comprise at least one of the following signals: a broadcast signal, a random access signal, a reference signal, a control signal, and a beam reference signal.

12. A method for signal transmission, comprising:
determining, by a network device, a quantity of beams used for transmitting signals or a number N of signals to be transmitted, wherein N is a positive integer; and
sending, by the network device, at least one of a synchronization signal and a synchronization channel to a terminal device; wherein, at least one of the synchronization signal and the synchronization channel is generated based on the quantity of the beams or the number N of the signals to be transmitted;
wherein the synchronization signal comprises a primary synchronization signal and a secondary synchronization signal; the method further comprises:
determining, by the network device, a quantity of first time-domain resource elements between the primary synchronization signal and the secondary synchronization signal corresponding to the quantity of the beams or the number N of the signals to be transmitted according to the quantity of the beams or the number N of the signals to be transmitted; or
determining, by the network device, a quantity of first frequency-domain resource elements between the primary synchronization signal and the secondary synchronization signal corresponding to the quantity of the beams or the number N of the signals to be transmitted according to the quantity of the beams or the number N of the signals to be transmitted;
wherein sending, by the network device, the synchronization signal to the terminal device, comprises:
sending, by the network device, the synchronization signal to the terminal device according to the quantity of the first time-domain resource elements or the quantity of the first frequency-domain resource elements.

13. A terminal device for signal transmission, comprising:
a memory, a processor, a transceiver, and a bus system, wherein the memory, the processor and the transceiver are connected through the bus system, the memory is used for storing instructions, the processor is used for executing the instructions stored in the memory to control the transceiver to transmit signals,
wherein the processor is configured to:
determine a quantity of beams used for transmitting signals or a number N of signals to be transmitted according to at least one of a detected synchronization signal and a detected synchronization channel, wherein N is a positive integer; and
transmit the signals with a network device according to the quantity of the beams or the number N of the signals to be transmitted;
wherein the synchronization signal comprises a primary synchronization signal and a secondary synchronization signal; wherein the processor is specifically configured to:
determine, according to a quantity of first time-domain resource elements between the primary synchronization signal and the secondary synchronization signal, the quantity of the beams or the number N of the signals to be transmitted corresponding to the quantity of the first time-domain resource elements; or
determine, according to a quantity of first frequency-domain resource elements between the primary synchronization signal and the secondary synchronization signal, the quantity of the beams or the number N of the signals to be transmitted corresponding to the quantity of the first frequency-domain resource elements.

14. The terminal device of claim 13, wherein the synchronization signal carries sequence information; wherein the processor is specifically configured to:
determine the quantity of the beams or the number N of the signals to be transmitted corresponding to the sequence information according to the sequence information.

15. The terminal device of claim 13, wherein the synchronization channel carries indication information used for indicating the quantity of beams or the number N of signals to be transmitted; wherein the processor is specifically configured to:
determine the quantity of the beams or the number N of the signals to be transmitted according to the indication information.

16. The terminal device of claim 13, wherein the processor is specifically configured to:
determine, according to a scrambling sequence used for the detected synchronization channel, the quantity of the beams or the number N of the signals to be transmitted corresponding to the scrambling sequence, or,
wherein the processor is specifically configured to:
determine, according to a quantity of second time-domain resource elements between the synchronization signal and the synchronization channel, the quantity of the beams or the number N of the signals to be transmitted corresponding to the quantity of the second time-domain resource elements; or
determine, according to a quantity of second frequency-domain resource elements between the synchronization signal and the synchronization channel, the quantity of the beams or the number N of the signals to be transmitted corresponding to the quantity of the second frequency-domain resource elements,
or,
wherein the processor is specifically configured to:
determine, according to physical resources for the synchronization signal, the quantity of the beams or the number N of the signals to be transmitted corresponding to the physical resources for the synchronization signal; or determine, according to physical resources for the synchronization channel, the quantity of the beams or the number N of the signals to be transmitted corresponding to the physical resources for the synchronization channel, or, wherein the processor is specifically configured to:

determine whether the signals are to be transmitted by using one beam or M beams according to the synchronization signal or the synchronization channel, or determine whether the quantity of the signals for transmission is 1 or K according to the synchronization signal or the synchronization channel, wherein M and K are pre-stored positive integers greater than 1, respectively.

17. The terminal device of claim 13, wherein physical resources for transmitting the synchronization signal and the synchronization channel have fixed relative positions; or a scrambling sequence used for the synchronization channel is generated based on sequence information carried by the synchronization signal.

18. The terminal device of claim 13, wherein the processor is specifically configured to:

determine physical resources or a sequence resource corresponding to the quantity of the beams or the number N of the signals to be transmitted according to the quantity of the beams or the number N of the signals to be transmitted; and transmit the signals with the network device, on the physical resources or by using the sequence resource, or, wherein the processor is specifically configured to:

send the signals on which beamforming corresponding to the quantity of the beams has been performed, to the network device, according to the quantity of the beams; or receive the signals on which beamforming corresponding to the quantity of the beams has been performed, sent by the network device, or, wherein the processor is specifically configured to:

send the N signals to the network device according to the number N of the signals to be transmitted; or receive the N signals sent by the network device according to the number N of the signals to be transmitted, wherein beamforming is performed on the N signals by using different beams, and N is a positive integer greater than 1.

* * * * *